United States Patent [19]

Calvignac et al.

[11] Patent Number: 4,761,781
[45] Date of Patent: Aug. 2, 1988

[54] ADAPTATIVE PACKET/CIRCUIT SWITCHED TRANSPORTATION METHOD AND SYSTEM

[75] Inventors: Jean Calvignac, LaGaude; Pierre Secondo, Saint Jeannet, both of France

[73] Assignee: International Business Machines Corp., Armonk, N.Y.

[21] Appl. No.: 893,075

[22] Filed: Aug. 4, 1986

[30] Foreign Application Priority Data

Aug. 13, 1985 [EP] European Pat. Off. ........ 85430027.4

[51] Int. Cl.$^4$ .............................................. H04J 3/26
[52] U.S. Cl. .......................................... 370/94; 370/79
[58] Field of Search ........................ 370/85, 89, 94, 95, 370/84, 79

[56] References Cited

U.S. PATENT DOCUMENTS 4,482,999 11/1984 Janson et al. .......................... 370/89
4,549,291 10/1985 Renoulin et al. ...................... 370/89

OTHER PUBLICATIONS

Proceedings of the 1982 International Symposium on Subscriber Loops and Services, 20-24 Sep. 1982, Toronto, Canada, pp. 35-39, IEEE Catalog No. 82CH 1686-5; R. Renoulin: "An Integrated Service Local Network . . .
The Second International Conference on Computer Communication, 12-14, Aug. 1974, Stockholm, pp. 507-515, K. Kummerle, "Multiplexor Performance for Integrated Line and Packet-Switched Traffic".

Primary Examiner—Douglas W. Olms
Attorney, Agent, or Firm—John B. Frisone

[57] ABSTRACT

Method and system for configuring a succession of complex frames to be used for exchanging synchronous circuit switched bits and asynchronous packet switched bits between nodes connected through medium links working at any bit rates in a teleprocessing network. Each complex frame contains an integer number of bits equal to Nc or Nc+1 chosen as close as possible to a predetermined number Na (256) and concludes a succession of subframes delimited by flags, in such a way that the period between two flags is equal to nT+e, T being the period of existing Time Divison Multiplex Frames (125 microseconds) and n being an integer number equal to or greater than 1 which depends upon the medium link bit rate and e being a period of time lower than a medium link bit period. The subframes have a duration equal to or less than T, each subframe containing an integer number of bits Nsi, said integer number being allocated to carry an integer number of circuit switched bit slots and the remaining bits being dedicated to asynchronous packet switched bits. The R bits remaining in the complex frame, with $$R = Nc - \sum_{i=1}^{n} Nsi$$

are used for flag bits f and r=R−f bits are used for asynchronous packet switched bits.

6 Claims, 11 Drawing Sheets

ADAPTATIVE PACKET/CIRCUIT SWITCHED TRANSPORTATION METHOD AND SYSTEM

DESCRIPTION OF THE INVENTION

1. Field of the Invention

This invention relates to a method and a system for providing the packet switching function along with the circuit switching function thru a telecommunication network.

2. Background Art

A telecommunication network is made of various nodes to which terminals are attached through communication controllers and which are linked through multiplex links.

Due to the bursty nature of most of the data to be transported, packet switching networks have been implemented to optimize the utilization of the network resources. However packet transportation implies large and variable transit delays that cannot be suffered by some real time applications. The variation of the transit delay can only be compensated by means of additional buffers at the end users, which is costly and implies delays.

On the other hand, circuit switch networks provide low constant transit delays, but lead to a bad utilization of the network links when bursty data is to be transported through the network.

The ISDN network (Integrated Service Digital Network) described in "I" series of International Telegraph and Telephone Consulative Commitee (CCITT) Recommendations is the present approach to circuit switching and packet switching integration. However the networks using the ISDN integration technique are not optimized for the data packet traffic since the bandwidth allocated to packet traffic is channelized. Furthermore the ISDN technique requires dedicated networks equipment, such as digital carriers.

Actually, most of the packet and circuit switching networks which intend to offer the ISDN services will use different packet and circuit equipments and for a long migration period and this will result in a duplication of the equipments and adapters. Reference is made to the Industry ISDN Seminar, Mar. 11, 1985 by Bell Communication Research.

This type of networks which integrate the transportation of character coded data and non coded information NCI such as voice, do not optimize the network resources (links, nodes etc.)

On one side, the users will need to transport a wide range of information types for example, coded and non coded, compressed or non compressed, real time or batch, voice or video, etc. On the other side the common carriers will offer a wide range of facilities with links able to support high bit rate which can be higher than 2 Megabits per second based on the current 64 Kilobits per second Time Division Multiplex TDM standard, coexisting with analog facilities, e.g. inter country analog primary groups, therefore there is a need to build network nodes able to handle any type of information and to use all available transportation media of any type and of any speed.

SUMMARY OF THE INVENTION

In this environment an object of the present invention is to provide a method and a system which optimize the bandwidth use on any type of link while providing the transportation of any type of information in a telecommunication network.

Another object of the invention is to provide such a method and a system which do not require a global synchronization of the network lines.

Another object of the invention is to provide such a method and a system which insures a dynamic allocation of the bandwith to circuit or packet traffic according to the user activity on a per call basis.

The transportation system and method according to the invention is to be used in a telecommunication network for exchanging circuit switched information which corresponds to a synchronous traffic, and packet switched information which corresponds to an asynchronous traffic, between nodes connected through a medium link operating at any bit rate.

The method and system according to the present invention allow the conventional packet switching function along with the circuit switching function to be provided thru the telecommunication network, sharing the same links and nodes with the three following characteristics:

any type of link carriers can be used, circuit subchannels are compatible with the worldwide telephone networks.

the bandwidth left by a non used circuit subchannel is automatically reused for packet traffic, The method and system consists in configuring in each transmitting adapter of a network node, a succession of complex frames. Each complex frame contains an integer number of bits equal to Nc and is made of a sucession of subframes. The complex frames are delimited by flags in such a way that the period between two flags is equal to $nT+e$, T being the period of existing Time Division Multiplex frames which for the present time is equal to 125 microseconds, n is an integer number higher or equal to 1 which depends on the medium speed and e is lower than the medium link bit period.

The subframes have a duration less or equal to T and each subframe contains an integer number of bits Ns. The Ns bits are allocated to an integer number of circuit switched bit slots and the remaining bits are used to carry asynchronous packet bits.

The R bits remaining in the complex frame, with $R = Nc - nNsi$ are used to carry f flag bits and $r = R - f$ potential padding bits which are filled with asynchronous packet switched bits.

For a given value v of the medium link speed there is a set of values n, Ns and R which meets the above requirements. The specific values which are chosen in each transmitting adapter depend upon constraints such as performances or implementation of the adapter. In a preferred embodiment of the invention Ns is chosen as close as possible to the number of bits contained in T to avoid the bit jitter in the complex frame.

The residual r bits may be placed at the end of the complex frames or may be spread in the specified subframes. In the first case, the subframes contain the fixed number Ns of bits and in the second case, they contain a variable number of bits so that a subframe i contains Nsi bits. The residual number of bits R1 at the end of the complex frame is equal to $$Nc - \sum_{i=1}^{n} Nsi$$

In that case, the flag is comprised in these R1 bits and there are r1 residual packet bits.

This invention also relates to a mechanism for dynamically allocating the circuit slots of the complex frames according to the user activity on a per call basis.

DETAILED DESCRIPTION OF THE INVENTION

Figure 1:
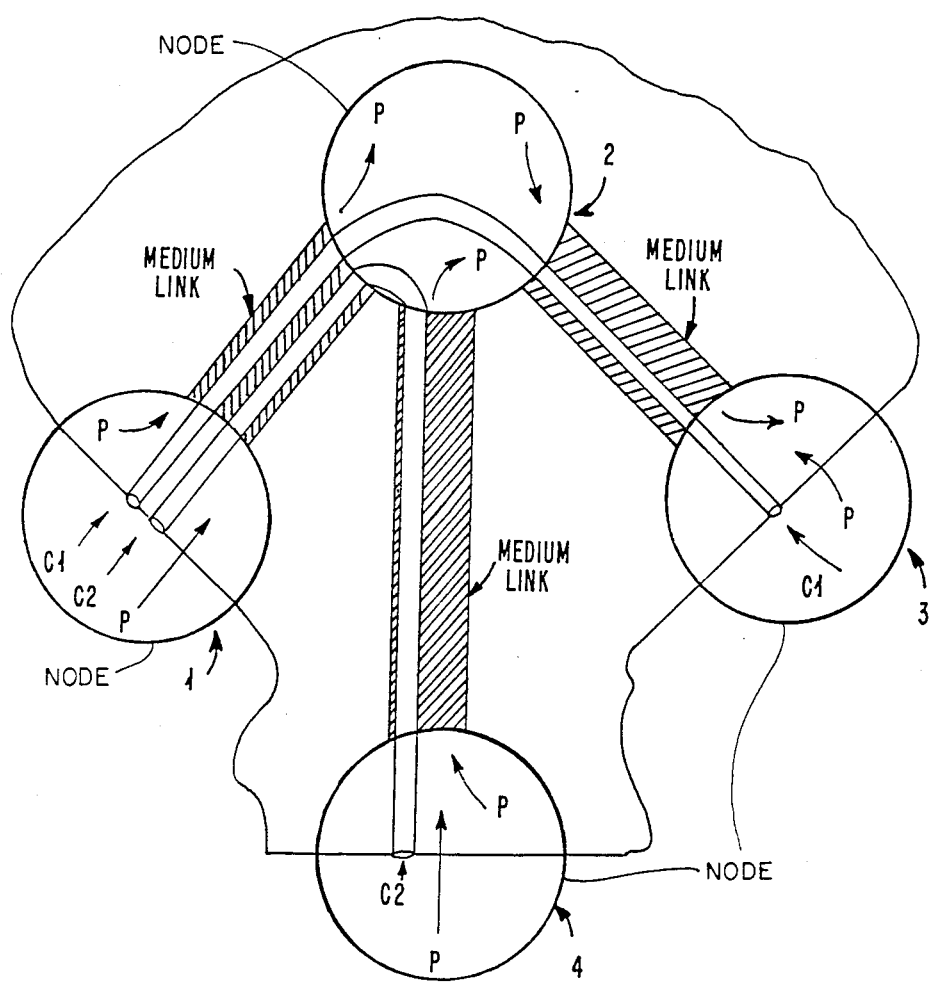
FIG. 1 shows schematically a telecommunication network wherein the present invention may be implemented.

A telecommunication network, as schematically shown in FIG. 1 comprises a plurality of nodes, four of which 1, 2, 3, 4 are represented. A plurality of circuit switched type users C and a plurality of packet switched type users P are attached to each node. The nodes are linked through medium links, the links between different nodes may operate at any speed v higher than u.64 kilobits per second, u being the number of circuit switched users. The users connected to a node share the link bandwidth in such a way that according to the present invention, at a given instant the circuit switched users exchange the non character coded information (NCI), such as voice, in subchannels and the remaining bandwidth is used for packet traffic. This is schematically represented in FIG. 1 by the hatched part of the links.

The circuit type users operates at 64 kilobits per second, 8 kHz structured which corresponds to the presently conventional bit rate, i.e. 8 bits every 125 microseconds. The man skilled in the art will be able to adapt the method according to the invention, if different bit rates become available in the future.

Figure 2A:
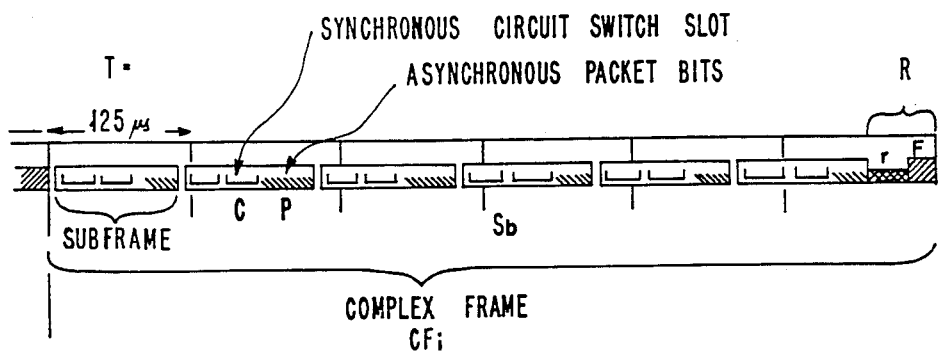
FIGS. 2-A and 2-B show the complex frames which are generated according to the method of the present invention.
Figure 2B:
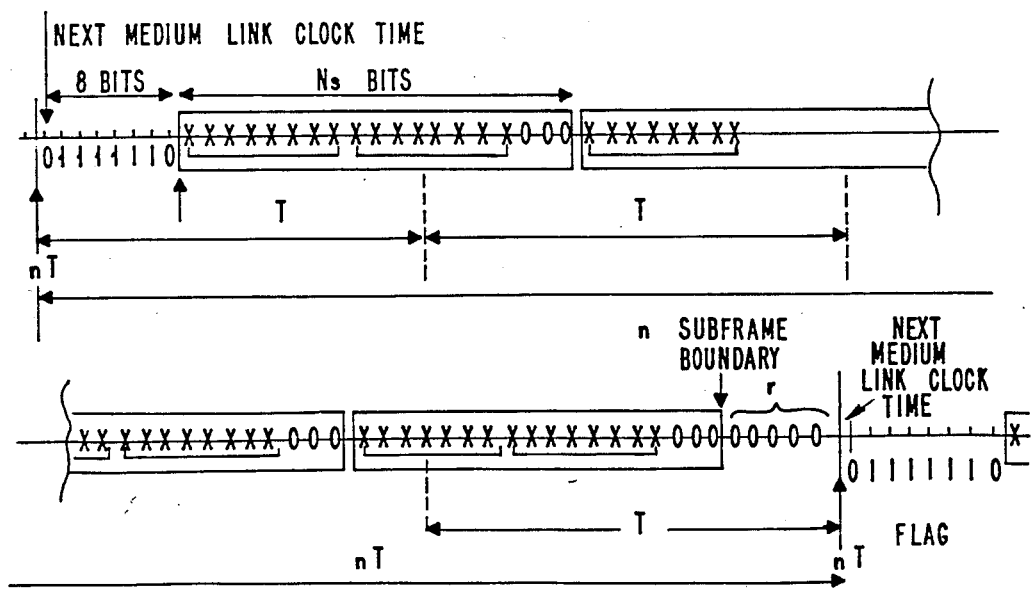

According to the present invention, the transmitting adapter of each node comprises means to cause the data and non coded information NCI bits such as voice emanating from the packet switched type users and from the circuit switched type users connected to the node to be transmitted on the medium link in complex frames having the structure shown in FIG. 2. The structure of the complex frames is determined using the method of the present invention which comprises the steps illustrated in FIG. 3.

For the sake of the explanation of the invention, the structure of the theoreatical complex frame is shown in FIG. 2-A. FIG. 2-B shows the complex frame which is generated by the means described in FIG. 6 to be sent on the medium link.

The complex frame contains Nc or Nc+1 bits and has a duration equal to nT+e, T being the conventional time division multiplex slot which for the present time is equal to 125 microseconds, n being an integer equal or higher than 1 and e being lower than a medium link bit period, n depends upon the link speed and is calculated as will be described in reference to FIG. 3.

The complex frames contain n subframes, each subframe has a duration equal or less than T so as to contain an integer number Ns of bits. The Ns bits of a subframe are allocated to the transportation of a variable number of circuit switched bit slots. The number of slots depends upon the user need, two slots are represented in FIG. 2, and the remaining bits are allocated to the transport of packet switched bits.

As above described, in the preferred embodiment of the present invention, the circuit user bit slots are dynamically allocated to active circuit users, so that the subframe structure changes depending upon the circuit user activity and the number of packet data bits varies. However, in specific applications this number may be fixed and the slots may be permanently allocated whether they are used or not.

The complex frames are delimited through a f-bit flag which is part of the R bits remaining at the end of the complex frame with $R = Nc - nNs$.

In cases where R is higher than f, the $r = R - f$ bits are filled with asynchronous traffic bits. The residual r bits, may be spread in given subframes to avoid jitter. This causes a variable determined number of bits Nsi to be contained in the subframes. This result in a different number R1 of residual bits at the end of the complex frame which is equal to $$Nc - \sum_{i=1}^{n} Nsi$$

As shown in FIG. 2-B, the flag is generated at the next medium link clock time following the nT boundaries. Then the n subframes comprising Ns bits and the r residual bits are sent on the medium link.

The invention will be more specifically described assuming that the subframes contain a constant number of bits, and the man skilled in the art can easily adapt the means which will be described later on to provide subframes having a variable number of bits according to the above requirements.

As can be seen in the hereafter table, depending upon the link speed versus 64 kbps, the complex frames do not contain a constant number of bits, however the variation of the bit number Nc in consecutive complex frames is only equal to 1. Thus, the complex frame limit is known by the receiving end thanks to the flag detection and bit counting. The minimum flag length which allows the complex frame delimitation is equal to 2 bits, however since the flag may also be used for other purposes a 8 bit flag is used in most applications. The only requirement is that the flag begins by 01 or 10. When the lowest possible number Nc of bits a complex frame have been counted from the beginning of the opening flag, the two next bits are analyzed. An equality of these bits with the two first bits of the flags, means that the frame contains Nc bits, if not, the frame contains Nc+1 bits. This is illustrated below:

Flag 01

. . XXXXX represent the frame bits which can be equal to 0 or 1

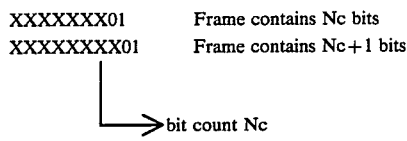

XXXXXXX01    Frame contains Nc bits
XXXXXXXX01   Frame contains Nc+1 bits bit count Nc Consequently, when Nc bits have been counted from the beginning of the preceding flag, the two next bits including the first bit of the flag and the additional bit of the frame, if any, cannot simulate the 01 delimiting pattern whatever the value of this additional frame bit can be. When Nc bits have been counted, the detection of the 01 pattern indicates that the frame contains Nc bits.

A flag beginning with 10 has also the same property.

Figure 3:
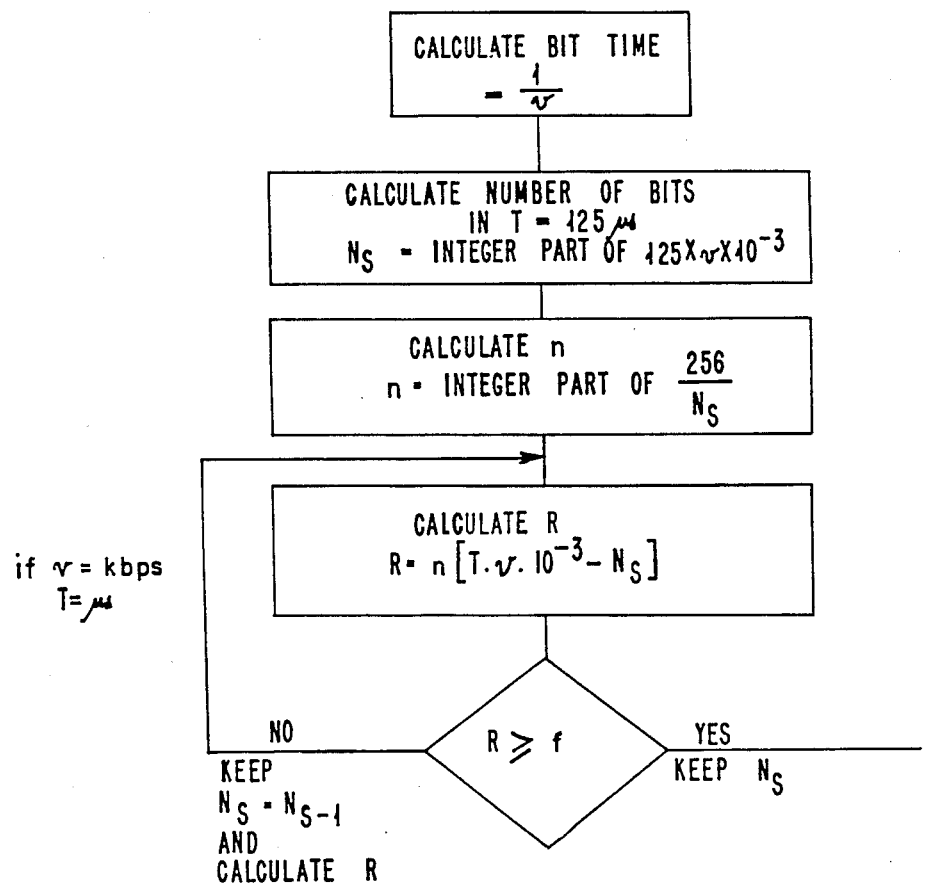
FIG. 3 shows how the parameters of the complex frames are calculated.

The method which is used for configuring the complex frames at each transmitting ends is represented in FIG. 3.

The speed of the medium link and the desired approximate number of bits Na in the complex frames determine the complex frame structure. In a specific embodiment of the invention, which for the present time is intended to be used with medium link speed lower or equal to 2.048 megabits per second, Na is chosen equal to 256 so that the number Nc be as close as possible to 256 bits, in order to keep a flag overhead ratio f/Nc in the same range as the one used for classical TDM first order multiplex links.

The method consists in calculating the link bit time t which is equal to 1/v, where v is the bit rate on the medium link. (Step 1)

Then the number of bits in the time division multiplex slot T is calculated. The number of bits Ns in each subframe is equal to the integer part of this number. Assuming that v is expressed in kilobits per second and T is equal to 125 microseconds, Ns is the integer part of the product $125.v.10^{-3}$. (Step 2)

Then the number n of subframes is calculated, this number is the integer part of the quotient Na/Ns. In the specific embodiment described in FIG. 3, it is the integer part of 256/Ns. (Step 3)

Then the residual number R of bits is calculated (Step 4). This number is equal the difference between the real number of bits comprised in T and Ns, multiplied by the subframe number n and can be expressed as follows:

$n.(T.v.10^{-3} - Ns)$

This number R is compared to f, (Step 5). If it is higher or equal to f, the number of bits in the subframes is made equal to the value of Ns calculated in step 2. If not the number of bits in the subframes is made equal to Ns calculated in step 2 minus 1. The residual number R of bits corresponding to this new subframe number is calculated.

Steps 4 and 5 are resumed as long as the residual number R is not higher or equal to f.

This method also applies when it is desired to have the residual bits spread in the subframes. In that case the theoretical numbers Ns and R are calculated according to the above described method and the residual bits are placed in specific identified subframes and the new residual bit number R1 is calculated so that the r1 bits, with r1=R1−f, if any remaining at the end of the complex frames may be filled with asynchronous traffic bits.

The following table gives the various values which are obtained according to the above method for four medium link speeds.

TABLE 1

| Medium link speed V kbps | Ns bits per subframe | Maximum number of circuit users at 64 kbps | Number n of subframes | r | f | Number of bits Nc or Nc + 1 in complex |
|---|---|---|---|---|---|---|
| 72 | 8 | 1 | 28 | 20 | 8 | 252 |
| 132 | 15 | 1 | 16 | 16 | 8 | 264 |
| 230 | 27 | 3 | 9 | 7 or 8 | 8 | 258 or 259 |
| 1544 | 185 | 23 | 1 | 0 | 8 | 193 |

Figure 4:
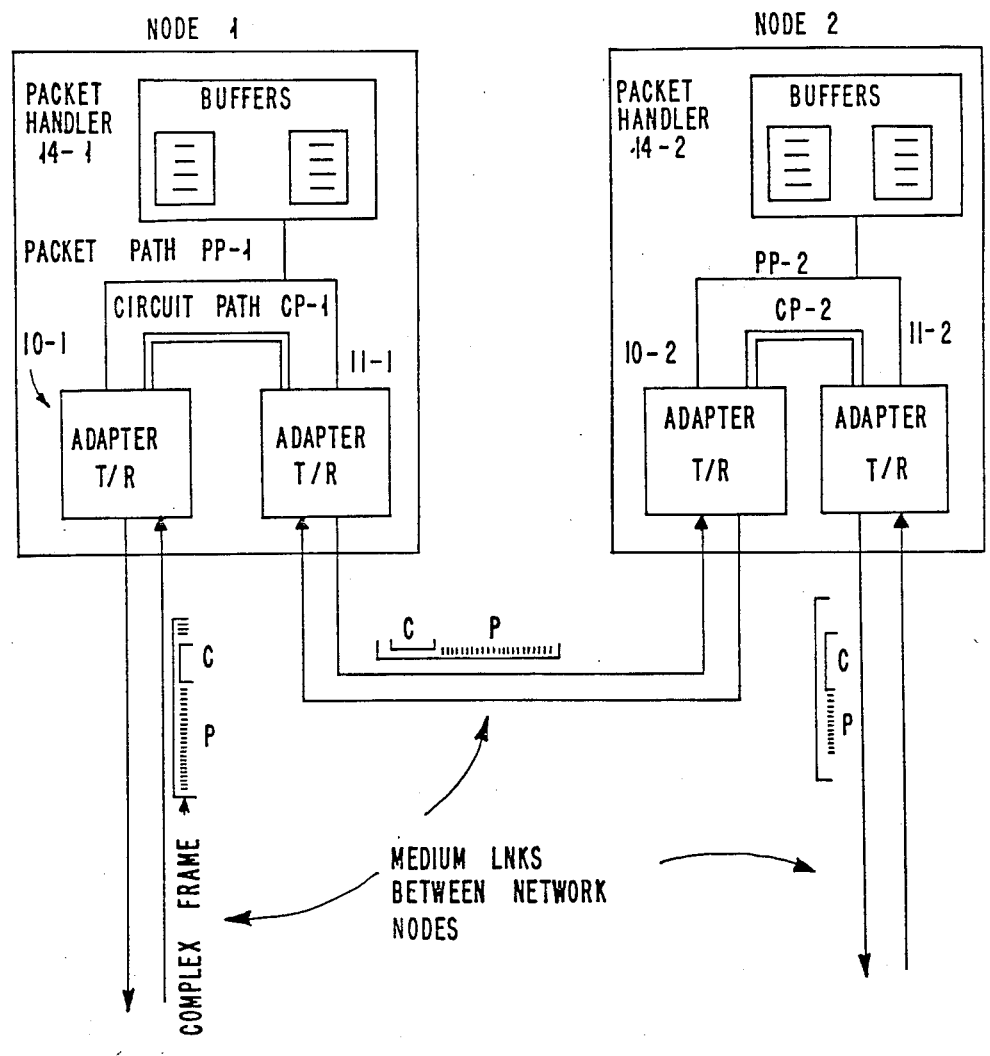
FIG. 4 shows the paths for packet and circuit bits in two nodes of the networks.

FIG. 4 shows two nodes of the telecommunication network. Each node comprises similar means, they are referenced by the same number with a suffix 1 for the means in node 1 and 2 for means in node 2. Each node comprises medium link adapters 10 and 11 made of receiver/transmitter means and including the specific means which are needed to implement the method according to the invention. The adapters are connected to medium links, each link having a specific speed, so that the complex frames on the different links have different configurations. These frames are built in the transmitter means of the adapters to be sent on the links. The parameters n, Ns, r of the complex frames are made known to the corresponding receiver means, in order the received bits may be processed. The complex frames are shown in a schematic way on the different links.

Two paths are provided in each node. One path CP is dedicated to the circuit switched bits (synchronous path) which have to be transmitted with constant and very short delay (<500 microseconds) and the other path PP is dedicated to the packet switched bits (asynchronous path) which are bufferized and processed in packet handling means 14.

Figure 5:
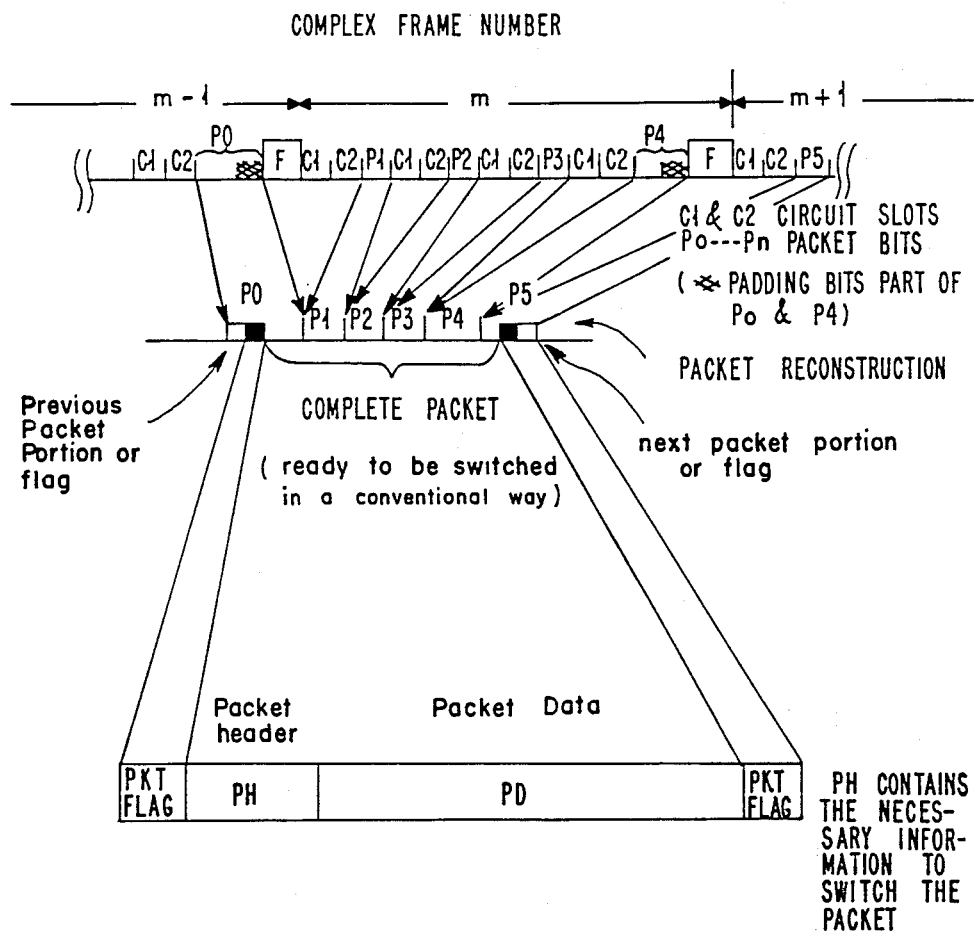
FIG. 5 shows how packet bits from successive frames are assembled to constitute a complete packet.

FIG. 5 shows how packets ready to be switched could be reconstructed in the receiving node from the asynchronous flow made of packet bits.

The consecutive received complex frames contain circuit user slots C1 and C2 for example, assuming that two circuit users are involved in a call and packet switcked bits P. Complex frame (m−1) contains packet bits P0, complex frame m contains packet bits P1, P2, P3, P4 and complex frame m+1 contains packet bits P5. For the purpose of illustration, it is assumed that a packet ready to be switched: i.e. constituted of a packet header containing the information which is necessary to route and switch the packet and packet data, comprising packet bits P1, P2, P3, P4 from complex frame m and parts of packet bits P0 and P5.

Figure 6:
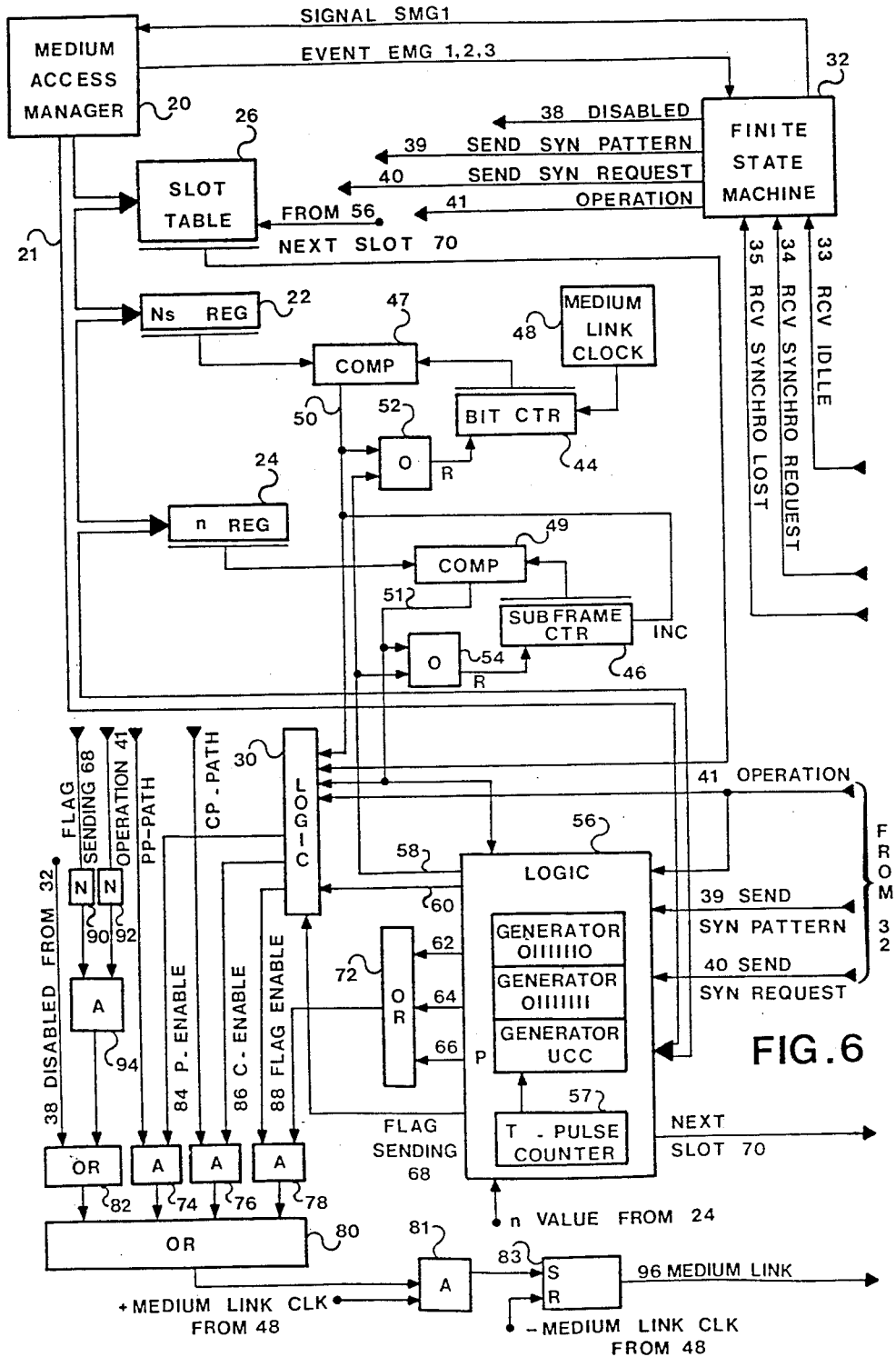
FIG. 6 shows the transmitting means for generating the complex frames on the transmit interface of a outgoing medium link connected to a node.
Figure 7:
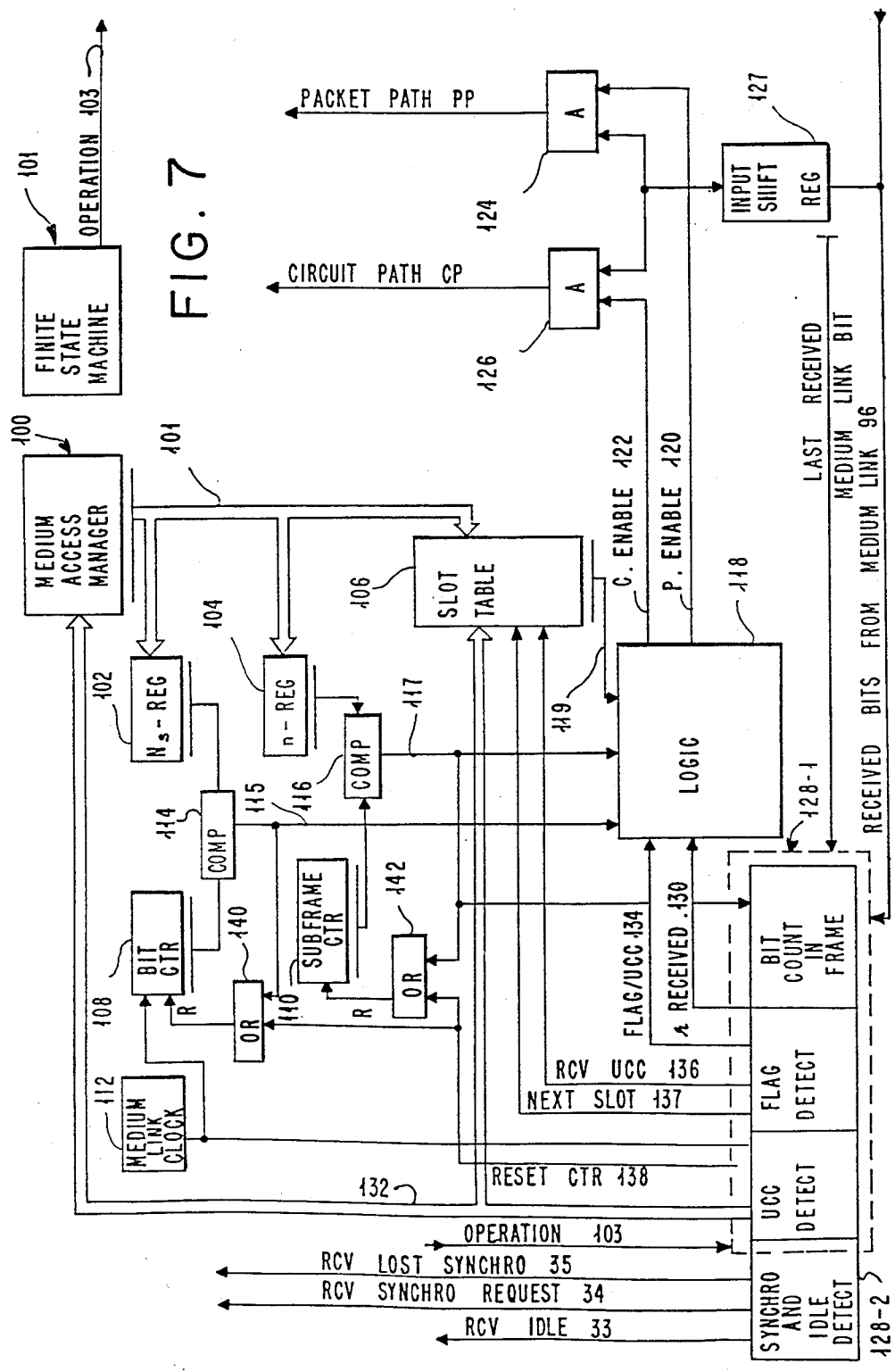
FIG. 7 shows the receiving means receiving the complex frame from the receive interface of an incoming link connected to a node.

FIGS. 6 and 7 show the specific means which are needed in the medium link adapters to implement the method according to the invention.

FIG. 6 represents the transmitting means and FIG. 7 represents the receiving means. For the sake of explanation, it is assumed that FIG. 6 shows the transmitting means of a first transmitting node and FIG. 7 shows the receiving means of a second receiving node. It is to be understood that, each adapter comprises receiving and transmitting means such as shown in FIGS. 6 and 7. The medium access manager and the finite state machine are common to the receiving and transmitting means in an adapter.

In the preferred embodiment of the transmitting means, the medium link access manager 20 computes the link parameters according to the method of FIG. 3 or by consulting tables which are built according to the method of FIG. 3.

In other embodiment of the invention, the parameters can be provided to the manager by external means, such as operator intervention.

The medium access manager also provides event indications to finite state machine 32, EMG1, 2, 3, and receives signal SMG3 from finite state machine 32 as will be described later on in connection with the finite state machine diagram.

The medium link access manager 20 provides through output bus 21 the link parameters Ns, n and the slot allocation to registers 22 and 24 and to slot table 26, respectively. Thus the slot table 26 contains an indication of the slots of the subframes which are allocated to circuit users. At each subframe generation, the slot table is read and its output 28 is used in logic circuit 30 to generate Packet or Circuit, P or C ENABLE signals.

The medium access protocol is managed through finite state machine 32 which is a logic providing control signals when specific events occur. The operation of this machine will be detailed later. It is connected to three lines 33, 34 and 35 from the associated receiving means, said lines carrying the RECEIVED IDLE PATTERN, RECEIVE SYNCHRO REQUEST and the RECEIVE LOST SYNCHRO signals respectively and to output bus 21. Depending upon the received events it generates on its output lines 38, 39, 40, 41 control signals DISABLED, SEND SYNCHRO PATTERN, SEND SYNCHRO REQUEST and OPERATION respectively.

Bit counter 44 working under control of a clock 48 operating at the medium speed counts the bits and the subframes. Counter 46 counts the subframes. The contents of counters 44 and 46 are compared with the Ns and n registers 22 and 24 by comparators 47 and 49. The output 50 of comparator 47 is provided to subframe counter 46 so as to cause this counter to be incremented each time an equality is detected by comparator 47.

Outputs 50 and 51 of the comparators, output 28 of slot table 26 are provided to logic 30 to generate the P ENABLE, C ENABLE and FLAG ENABLE signals at the correct times to build the complex frame according to the method of the present invention.

Logic 30 also receives the OPERATION control signal from finite state machine 32.

Flag and r sending logic control circuit 56 working under control of T-pulse counter 57, medium link bit clock 48 and outputs 50 and 51 of comparators 47 and 49 allows specific patterns to be sent on the medium link at given instants under control of the signals on output lines 39, 40 and 41 of finite state machine 32. It also provides a reset counter signal on its output line 58. Output line 58 and output lines 50 and 51 of comparators 47 and 49 are provided to OR circuits 52 and 54 which provide the reset signal to bit and subframe counters 44 and 46 respectively.

Circuit 56 also generates on output line 60, a r sending control signal which is provided to logic 30 so as to cause the r residual packet bits to be sent on the medium link in order to generate the complex frames as described in reference to FIG. 2-B.

The different flags are generated by circuit 56 on output lines 62, 64 and 66. As will be described later on, different flags have to be sent at given times. In a specific embodiment of the invention, 01111110 is the normal complex frames delimiter, abort flag 01111111 is used to request the synchronization and UCC flag is used for indicating to the receiving means that a circuit user is added or deleted, in case the dynamic bandwidth allocation feature is implemented. If not, there is no need of this UCC flag.

Consequently, generator 56 generates the medium flag 01111110 under control of OPERATION and SEND SYNCHRO PATTERN signals on lines 41 and 39 from finite state machine 32.

Circuit 56 generates the specific flag 01111111 under control of SEND SYNCHRO REQUEST line 40 from finite state machine 32.

In the preferred embodiment of the invention, circuit 56 generates the USER CIRCUIT CHANGE pattern UCC which is used for changing the user slots in the subframes. This pattern is changed under control of the medium access manager 20, so that circuit 56 receives the pattern to be generated on bus 21. This part has only to be provided when it is desired to have the capability of adding or deleting circuit users. When the circuit slots are permently allocated, this part is not required as all means which are required in connection with this capability.

The flag outputs 62, 64 and 66 of circuit 56 are provided to OR circuit 72.

Circuit 56 also generates a flag sending control signal on line 68 which is provided to logic 30 and which is also used during the initialization period to prevent the idle 111 . . . 11 configuration from being sent on the medium link during the flag sending period as will be detailed later on.

Circuit 56 generates a next slot signal on line 70, which is provided to the slot table to cause the table to be scanned in order to have the P or C indication to be provided to logic 30 through output line 28 of slot table 26.

The packet user bits from path PP and the circuit user bits from path CP or the specific patterns from the output of OR circuit 72 are transmitted on medium link 96 at specific instant to build the complex frames through AND gates 74, 76 and 78 and OR gate 80. AND gate 74 receives the P ENABLE signal from output line 84 of logic circuit 30 and the packet switched bits from PP path. AND gate 76 receives the C ENABLE signal from output line 86 of circuit 30 and the circuit switched bits from path CP. AND gate 78 receive the FLAG ENABLE signal from output line 88 of circuit 30 and the specific flag patterns from output of OR circuit 72.

The outputs of AND gates 74, 76 and 78 are provided to OR circuit 80. The output of OR circuit 80 is provided to AND gate 81 which is conditioned when the medium link clock signal is positive, for example. The output of AND gate 81 set latch 83 which is reset when the medium link clock signal is negative. Thus latch 83 provides on its output the bit to be transmitted on the medium link 96.

OR circuit 82 receiving the DISABLED signal from output line 38 of finite state machine 32 has its output connected to OR circuit 80, so that the idle configuration 11 . . . 1111 is sent on the medium link 96 through AND gate 81 and latch 83 when the DISABLED signal is active.

AND gate 94 receiving the OPERATION signal from line 41 inverted by inverter 92 and the flag sending control signal from line 68 of circuit 56, has its output connected to OR circuit 82 to send the all mark 111 . . . 111 configuration on medium link 96 during the initialization period, between flags.

Figure 8:
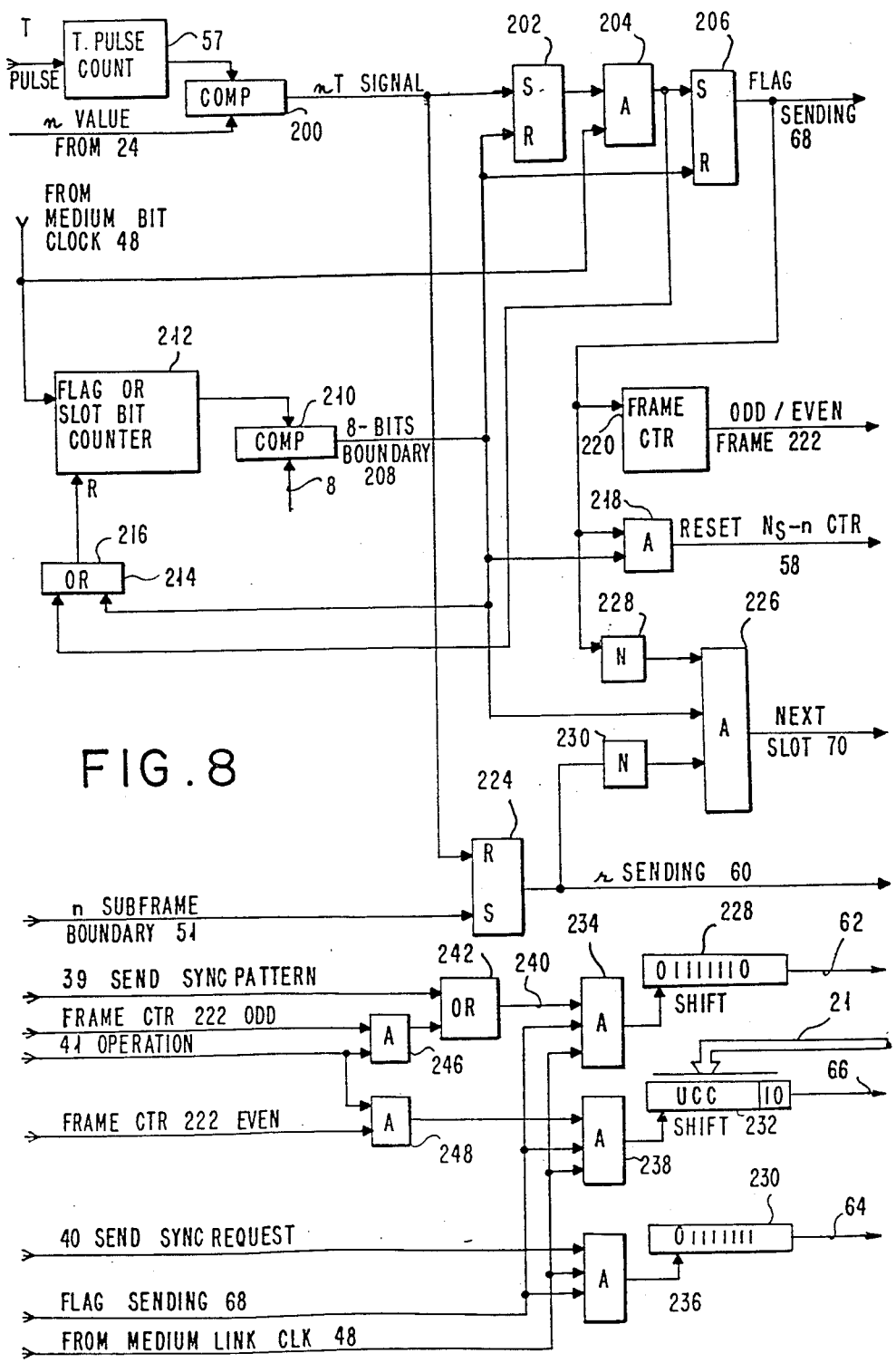
FIG. 8 shows circuit 56 of the transmitting means.

An embodiment of circuit 56 will be described in reference to FIG. 8.

The receiving means shown in FIG. 7 will now be described, so that the operation of the transmitting means will be explained in connection with the operation of the receiving means.

In the receiving means which is assumed to be in the adapter of the second node to be linked to the first node comprising the transmitting means described in reference to FIG. 6, the adapter medium access manager 100 is represented.

The finite state machine 101 of the adapter is also schematically shown in FIG. 7, only OPERATION output line 103 which is needed for the receiving operation is represented.

The link parameters Nc, n and Ns have to be known from the receiving means. They may be transmitted from the transmitting means or may be calculated in the receiving means. In a specific embodiment of the invention, they are found in the receiving means by consulting tables containing the correlation between Nc and the desired parameters values, Nc being the number of bits received between two flags during the initialization period, i.e. being an indication of the link speed.

The medium link parameters are loaded in Ns-register 102, n-register 104 and slot table 106 through output bus 101.

The receiving means also comprises a bit counter 108 and a subframe counter 110. Bit counter 108 works under control of medium link clock 112. Comparator 114 compares the content of counter 108 and Ns-register 102 and comparator 116 compares the content of counter 110 and n-register 104 so as to generate signals on their output lines 115 and 117 which are active when an equality is detected. Output lines 115 and 117 are connected together with the output line 119 of slot table 106 to logic circuit 118. Logic circuit 118 generates P ENABLE or C ENABLE signal on output lines 120 and 122 respectively.

The detection of an equality by comparators 114 and 116 causes counters 108 and 110 to be reset.

The received bits on medium link 96 are provided to two AND gates 124 and 126 by means of 8-bit shift register 127. AND gates 124 and 126 are conditioned by the P ENABLE and the C ENABLE signals on lines 120 and 122 respectively. Their outputs are provided to the packet switched bit handling facility of the receiver and to the circuit switched bit handling facility, where the packet and circuit switched bits are processed in the conventional way. These facilities are not described since they are not the subject of the invention.

The received bits are also provided to circuit 128. Circuit 128 comprises means 128-1 for detecting the flags and counting the bits in the complex frames. In normal mode of operation, i.e. after the initialization period, "r Received" output line 130 of circuit 128 is activated so as to cause the P ENABLE signal at output of logic 118 to be activated so that the r residual bits are provided to the packet switched bit handling facility through AND gate 124.

It also detects the UCC flags which are transmitted to the slot table through bus 132 in order the receiving means take into account the circuit user change transmitted by the transmitting means and generates the RCV UCC signal on line 136 and the next slot signal on line 137 which causes the content of slot table 106 to be scanned to cause the P and C ENABLE signals to be activated according to the subframe configurations.

Circuit 128-1 generates a reset CTR signal on line 138 which is provided to OR circuits 140 and 142. The outputs of comparators 114 and 116 are also provided to OR circuits 140 and 142 whose outputs control the resetting of counters 108 and 110.

The function of shift register 127 is to delay the received bits in such a way that the flag detection may be performed in circuit 128.

Circuit 128 detects the flags in the received bits and from this flag detection and the counting of bits, part 128-2 detects when the synchronization is lost to generate the RCV LOST SYNCHRO and RCV SYNCHRO REQUEST on lines 35 and 34. It also detects the all mark 11 . . . 111 received bit stream to generate the RCV IDLE signal on line 33. These three signals are sent to the transmitting means as shown in FIG. 6.

A specific embodiment of part 128-1 will be described in reference to FIG. 9.

The operation of the transmitting and receiving means will now be described. Through the framing of the medium complex frame, the adjacent medium access elements are able to exchange status information and signals.

The different states are the following:

DISABLED: send idle pattern, i.e. 11 . . . 1111

ENABLED: send SYNCHRO (01111110) or SYNCHRO REQUEST (01111111) at transmitting end and SEARCH FOR RECEIVE SYNHRO at receiving end, SYNCHRONIZED: receive SYNCHRO without SYNCHRO REQUEST and send SYNCHRO without SYNCHRO REQUEST OPERATIONAL: send/receive normal frame; send/receive User Circuit Change UCC The finite state machine generates signals which depend upon the occurrence of events. There are two kinds of signals and events, namely the medium access manager events and signals and the medium link events and signals.

MANAGER EVENTS AND SIGNALS

EVENTS:

EMG1: Load transmit medium access parameters Ns, n
EMG2: Load receive medium access parameters
EMG3: Add circuit user

SIGNALS

SMG1: User Circuit Change UCC

MEDIUM EVENTS AND SIGNALS

EVENTS

EMD1: Receive idle, i.e. all mark
EMD2: Receive SYNCHRO REQUEST, i.e. 01111111 in place of flag
EMD3: Receive LOST SYNCHRO if not 01XXXXXX every medium frame
EMD4: Receive UCC, i.e. 010CXXXX in place of flags where 01 are the two delimiting bits of the flags and the following zero indicates a circuit user change, C=0 means delete and C=1 means add and XXXX means the user number from 0000 to 1111. If there are more than 16 circuit users, the user number to be added or deleted is encoded in two consecutive frames. In that case, in the first coding frame UCC value 010C1111 indicates that the circuit user number is encoded on two consecutive frames, said number being equal to 1110 plus the value in the opening flag of the following frame.

EMD5: receive normal frame
EMD6: receive SYNCHRO PATTERN: normal flag 01111110 with ones between the flags, the medium frame is thus constituted of all ones.

SIGNALS

SMD1: Send idle
SMD2: Send SYNCHRO REQUEST
SMD3: Send SYNCHRO PATTERN
SMD4: Send normal frame
SMD5: Send circuit user change The medium access protocol is managed according to the following state diagram through the finite state machine.

Legend:
State
I Event
I 
I Signal

The operation of the transmitting means and receiving means located at both ends of a medium link between two nodes 1 and 2 will now be described.

Before an exchange is established between the two nodes, an initialization period is required for synchronization purposes. This initialization period encompasses the states DISABLED, ENABLED and SYNCHRONIZED as described in the state diagram.

From the node power on reset, the following operations are performed:

The idle configuration corresponding to all marks i.e. 11 . . . 111 is sent by the transmitting means in node 1 and transmitting means in node 2 which are in the disabled state. In that state the disabled signal is active and OR gate 82 provides the idle pattern to the medium link 96.

STATE DIAGRAM

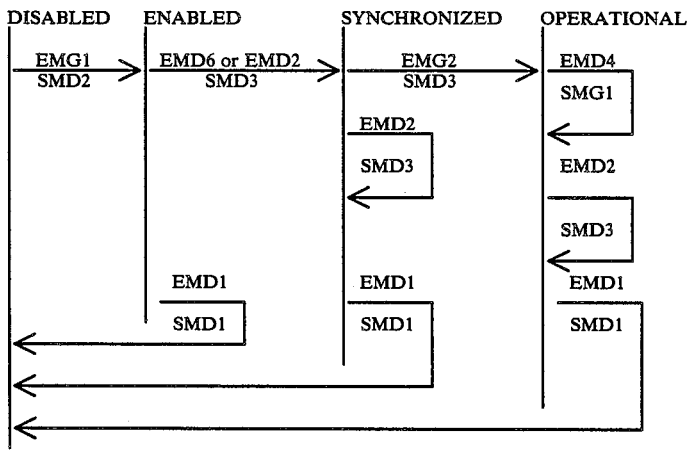

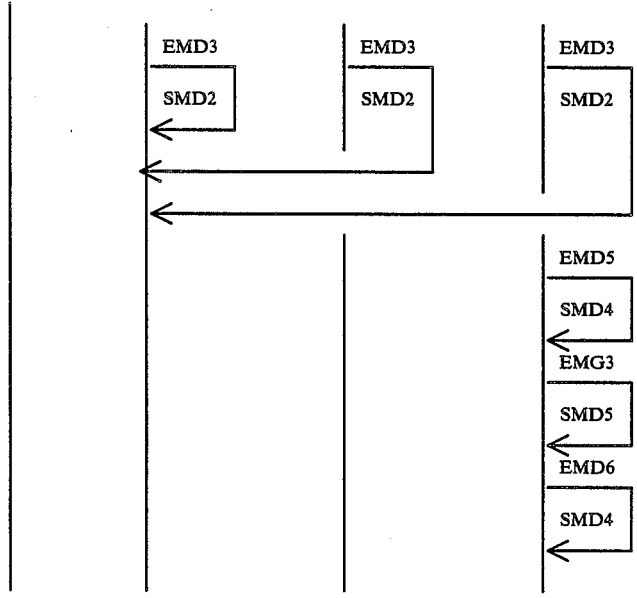

The medium access manager in node 1 adapter loads the medium link parameters in n and Ns registers 24 and 22 of transmitting means.

Then, the transmitting means generates through flag and r sending control circuit 56:

1-synchro pattern without synchro request if synchro not lost (SMD3) i.e.:

0111111011111111 ... 1110111111011111 ...

←—flag —→←—all mark —→←—flag —→←—all mark
         n.T microsec.

2-synchro pattern with synchro request if synchro lost, (SMD2) i.e.

01111111111 ... 111111101111111111111111 ... 11101111111

←—flag —→←—all mark —→←—flag —→←—all mark —→←—flag —→

During this initialization period, P ENABLE signal is active so that all the bits between the flags are handled as packet switched bits. The number of bits between flags is an indication of the link speed which is used in the receiving means to get the Nc receiving parameter.

The 1 at the end of the flags indicate that synchro is requested at the receiving end.

When the node 1 transmitting means detects that the SYNCHRO REQUEST line 34 is no more active which means that synchro is no longer requested by receiving means in node 2, the transmitting means in node 1 stop the synchro pattern generation, and may switch from continuous flag sending at n.T boundaries (SMD3) to normal or UCC flag sending: (SMD4 and SMD5). This corresponds to the OPERATIONAL state as defined in the state diagram.

The UCC flags which are thus transmitted are used in the receiving means for loading slot table 106.

If no UCC change is received from medium access manager the normal flag is sent instead of the UCC flag.

The link parameters computed by consulting tables containing the parameters as a function of Nc, are loaded in registers 102 and 104 of receiving means in node 2.

While in operational state, all mark bits are sent in the frame between the flags by nodes 1 and 2, till one of the nodes has something to transmit. At that time, the slot table 26 in the transmitting means of the node having something to transmit is loaded according to the active circuit user configuration.

In the receiving means, the slot table 106 is loaded through the UCC detection in circuit 128.

Then, the complex normal frames built according to the method of the invention are exchanged between the two nodes. Comparators 47 and 49 detect the end of the subframes and of the n subframes in the complex frames. This detection and the scanning of the slot table causes P, C and F ENABLE signal to be activated through gating logic 30 to build the complex frames as shown in FIG. 2-B.

In reference to FIGS. 8, 9 and 2-B, it will now be described how the flags and the r residual bits are generated and received.

In circuit 56, counter 57 counts the T (125 microseconds) periods, the T-pulse count at the output of counter 57 is compared with the n value provided by register 24 by comparator 200. Comparator 200 provides an active signal when an equality is detected, this active signal indicating a nT boundary. When a nT boundary is detected, latch 202 is set. The output of latch 202 and the output of medium link clock 48 are provided to AND gate 204.

The output of gate 204 sets FLAG latch 206 which thus provides on its output 68 the FLAG SENDING control signal which is active at the bit clock time following a nT boundary. Latches 202 and 206 are reset by the signal on line 208 at the output of comparator 210.

Comparator 210 compares the content of flag or slot bit counter 212 which counts modulo eight, the medium bit clock from 48, with eight. This counter is reset at the medium link clock pulse following a nT boundary or at the eight-modulo bit boundary through OR gate 214 by connecting output of comparator 210 to one OR gate 214 input. The other input of OR gate 214 is connected to the output of AND gate 204 and to the output of comparator 210, so as to provide the reset signal on its output 216.

Output 208 of comparator 210 is connected to the reset input of latches 202 and 206 in order to reset the latches on the eight-bit boundaries so as to provide on output 68 of latch 206 a FLAG SENDING control signal which is active during the eight-bit flag periods.

Comparator output line 208 and FLAG SENDING control line 68 are provided to AND gate 218 which thus provides the reset signal for Ns and n counters 22 and 24 (FIG. 6), on line 58. This signal is active at the end of the flag sending period, so that counters 22 and 24 are reset to zero in order to initiate the bit and subframe counting from that time.

The FLAG SENDING signal on line 68 is provided to frame counter 220 which is a one-bit counter providing an indication that the sent frame number is even or odd. This indication is required for sending normal flag or UCC flag alternatively.

Latch 224 is set at the n subframes boundary which is detected when comparator 49 detects an equality and provides an active signal on line 51 and is reset when the flag sending period begins which is detected by comparator 200. Thus the output of comparator 200 is provided to the reset input of latch 224, which is thus set during the r sending period and provides the r sending control signal on output 60, see FIG. 2-B for r sending period.

AND gate 226 is connected to the output 208 of comparator 210, to FLAG SENDING PERIOD line 68 through inverter 228 and to the output 60 of latch 224 through inverter 230. Thus AND gate provides an active output signal on its output 70 at the eight-bit boundaries when FLAG SENDING and r SENDING control signals are inactive. Thus AND gate 226 provides on line 70 the NEXT SLOT control signal which is used for scanning slot table 26.

The flag patterns 01111110 and 01111111 are contained in shift registers 228 and 230 and the UCC flags are loaded in shift register 232 from bus 21. The two most right bits of shift register 232 are set to 10 and the other bits indicates either the user change, if any, or are set to 011111 if no user change is requested.

The shifting of registers 228, 230 and 232 is performed under control of a logic circuit comprising AND gates 234, 236 and 238. These AND gates are conditioned by the FLAG SENDING signal on line 8 and by the medium bit clock signals from 48.

AND gate 234 provides an active shifting output signal when its third input 240 is activated by means of OR gate 242 and AND gate 246. AND gate 246 provides an active signal to one input of OR gate 240 when the OPERATION line 41 from finite state machine 32 is activated and when the output of frame counter 220 is at a first value corresponding to an odd frame number, for example. The second input of OR gate receives the SEND SYNCHRO PATTERN signal from output line 39 of finite state machine 32.

When these conditions are met, the normal 01111110 flag in register 228 is provided on line 62 to be sent by AND gate 78 (FIG. 6) on medium link 96.

AND gate 236 provides an active shifting output signal during the flag sending period when the SEND SYNCHRO REQUEST signal on line 40 from finite state machine 32 is activated. Thus during this period the abort flag 01111111 is provided to AND gate 78 (FIG. 6) to be sent on medium link 96.

AND gate 238 provides an active shifting output signal during the flag sending period when AND gate 248 is activated i.e. when the OPERATION signal on line 41 from finite state machine 32 is active and when frame counter 220 indicates an even frame number. Thus during this period, the UCC flag is provided to AND gate 78 to be sent on medium link 96.

Figure 9:
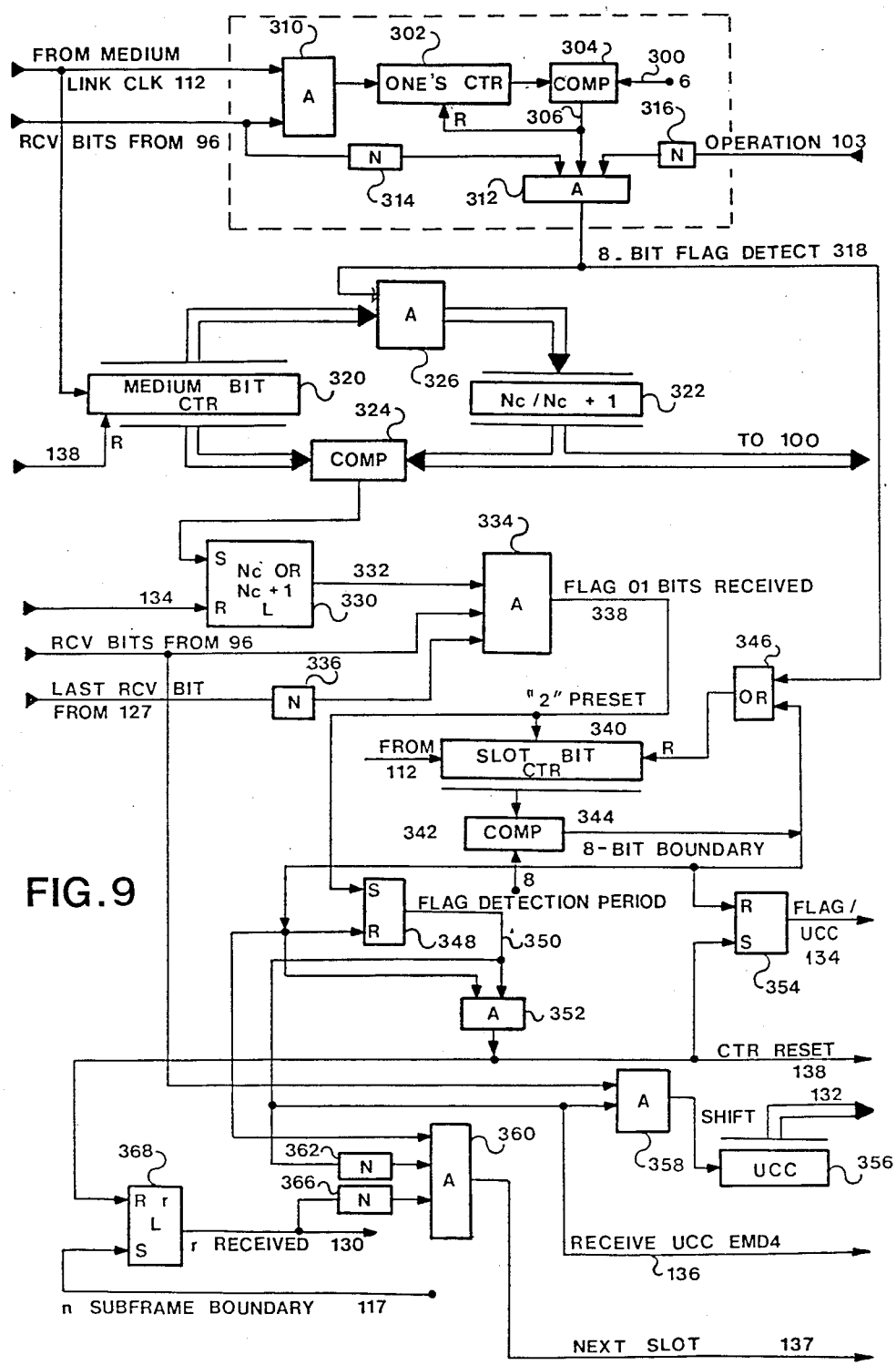
FIG. 9 shows circuit 128-1 of the receiving means.

FIG. 9 represents part 128-1 which performs the flag handling and generates the control signal which allows the P-ENABLE line 120 to be activated when the r residual bits are received.

It comprises circuit 300 which detects the flag configuration during the initialization period i.e. when the OPERATION signal 103 from finite state machine 101 is not activated. Circuit 300 comprises one-counter 302 which counts the ones in the received bit stream. Received bit stream from link 96 is provided to AND gate 310 which also receives the medium link clock signal from 112. The output of AND gate 310 is provided to the one counter 302. Counter 302 content is compared with six in comparator 304 so that when six consecutive ones are found in the received bit stream output 306 of comparator is activated and counter 302 is reset.

The output 306 of comparator 304 is provided to AND gate 312 which also received the bit stream on link 96 inverted in inverter 314 and the OPERATION signal from line 103 inverted in inverter 316. Thus AND gate 312 provides on its output line 318 a eight-bit flag detect signal which is activated during the initialization period when six consecutive ones followed by a zero are received.

The value Nc or Nc+1 of the complex frame bits is found during the initialization period by means of medium bit counter 320, Nc/Nc+1 register 322, comparator 324 and AND gates 326. Counter 320 counts the medium link clock pulses from 112 and is reset by Ns and n counter reset signal from line 138. The content of counter 320 is gated by AND gate 326 when signal on line 318 is activated, in register 322. Consequently register 322 contains the number of complex frame bits between two flags.

The medium access manager loads the parameters calculated from Nc/Nc+ and then becomes operational.

Then, register 322 content is compared with medium bit counter content in comparator 324, which provides an output signal on line 328 which is activated when medium bits counter 320 reaches the value recorded in register 322. This active signal set latch 330 which controls the detection of the 01 first bits of the received flag.

The output line 332 of latch 330 is provided to AND gate 334 to which is also provided the received medium bit from link 96 and the last received medium bit taken in register 127 (FIG. 7) and inverted in inverter 336. Consequently AND gate 334 provides an output signal on line 338 indicating that the 01 delimiting configuration of the flag has been received. This signal is used to preset at 2, slot bit counter 340. Slot bit counter counts the slot bits and its content is compared to 8 in comparator 342. Output line 344 of comparator 342 is activated when an equality is detected which indicates a 8-bit medium link boundary. Counter 340 is reset by the output of OR gate 346 which receives the 8-bit flag detect signal on line 318 and the 8-bit medium link boundary signal on line 344.

Latch 348 is set by the 2-bit defimiting pattern of the flag received signal on line 338 and reset by the 8-bit medium link boundary signal on line 344, so that it remains set during six bit period after the detection of the 01 delimiting pattern of the flag.

The output line 350 of latch 348 is provided to AND gate 352 which also receives the output line 344 of comparator 342. Thus the output signal of AND gate 352 is activated so as to provide the n and Ns counter reset signal on line 138 during the flag detection period.

Latch 354 is set by the signal on line 138 and is reset by the 8-bit medium link boundary signal 344 and provides to logic 118 in FIG. 7 the FLAG/UCC period signal on line 134 which is activated during eight bit period following the last bit of the flag. This signal is needed to compensate the delay of the received bit stream introduced by shift register 127 in FIG. 7.

During the six bit period following the 01 delimiting configuration of the flag, the received medium bits are shifted in register 356 through AND gate 358 the inputs of which are connected to link 96 and to output line 350 of latch 348. Output bus 132 of UCC register 356 is provided to medium access manager 100 and used to update slot table 106.

Output 350 of latch 348 provides the receive UCC signal on line 136 which is provided to logic 118 of FIG. 7 corresponding to the event EMD4 of finite state machine diagram.

AND gate 360 receives the 8-bit medium link boundary signal on line 344, the flag detection period signal on line 350 inverted by inverter 362 and the r received signal on line 130 inverted in inverter 366 and provides on its output line 137 the NEXT SLOT signal used for scanning slot table 106 in FIG. 7.

The r received signal on line 364 is provided by latch 368 which is set when comparator 117 detects an equality and is reset by the reset signal on line 138. Consequently this latch is set so as to activate the P ENABLE line 120 for gating the r residual bits to the packet path PP.

It will now be described how the bandwidth is allocated as a function of the circuit user activity.

During the initialization phase, once the transmitting and receiving ends are set into the operational state, i.e. once the parameters are loaded into the transmitting and receiving parameter registers, all bits which are transmitted between two flags are interpreted as packet switched bits until circuit user slots are established. These bits are coded and decoded by the ends as a normal HDLC channel. They constitute an HDLC string having a conventional format. Each HDLC frame contains a packet and the two first bytes of the data field of the packet contain a logical channel number LCN as defined in the CCITT recommendation X.25. This LCN value is set at 0 to indicate that the corresponding packet is a control packet used for managing a call in the network. This constitutes a logical control channel similar to the "D" channel of ISDN. The packets having their LCN values different from 0 are used for other flow including the data flow.

The packet types are those defined by the X25 protocol, for example
 Call request
 Call connected
 Clear request
 Clear confirmation.

Figure 10:
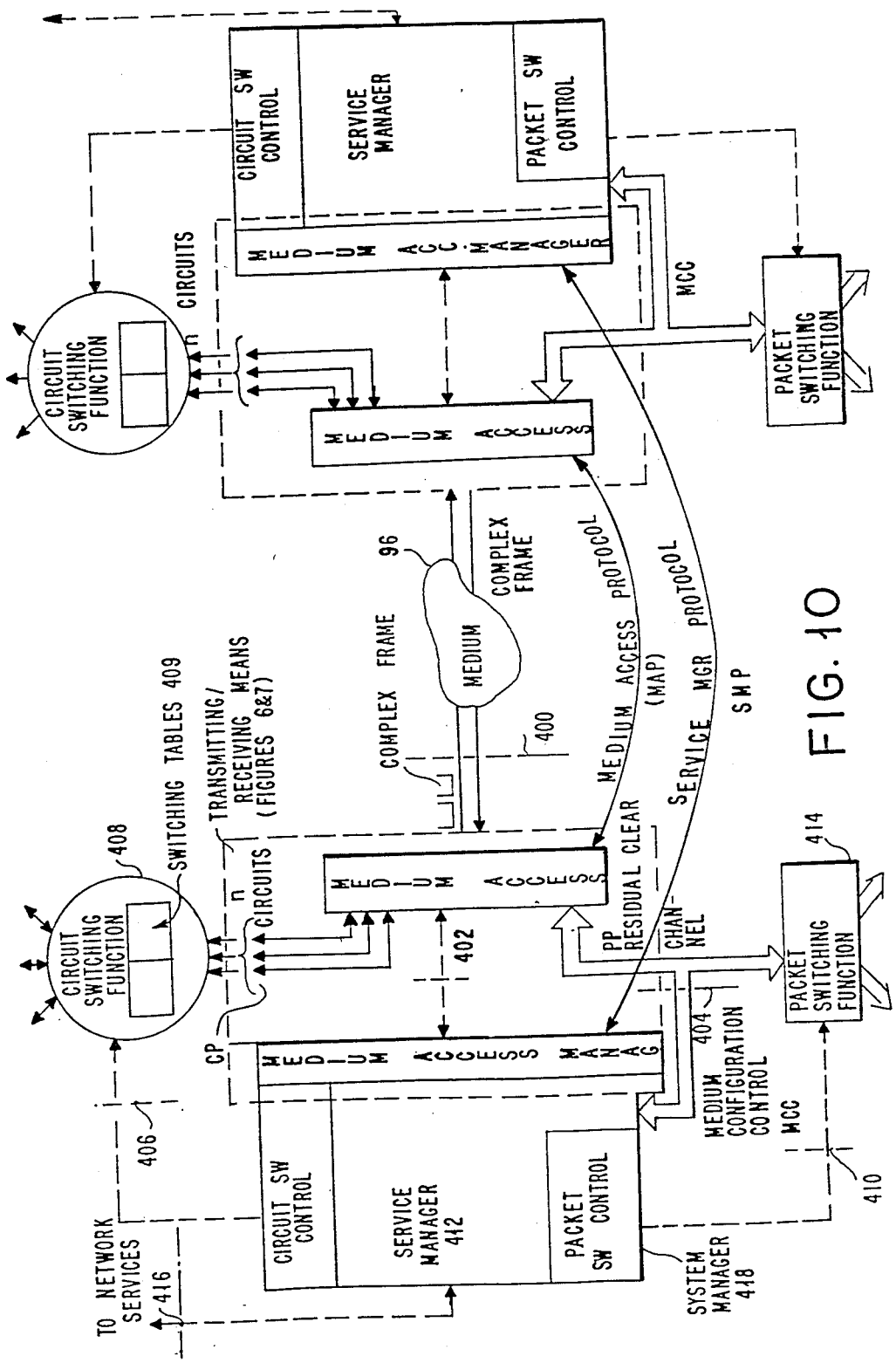
FIG. 10 shows two adjacent nodes in the network and shows schematically the protocols and interfaces defined in the system according to the invention.

FIG. 10 represents two adjacent nodes in a network, one medium link comprising transmit and receive legs is represented between the two nodes. However, other medium links connecting said nodes with other nodes in the network are in fact provided as shematically shown in FIG. 1. FIG. 10 shows more specifically the protocols and interfaces defined in the system according to the invention. Medium interface 400 defines the medium complex frames. Medium access interface 402 defines the commands used by the medium access manager to control the medium access elements such as shown in FIGS. 6 and 7, to add or release circuit switch bandwidth by direct action on the complex frame.

Medium configuration control MCC interface 404 defines the format of the messages i.e. packet bits circulating on logical channel 0 (LCN=0) that are the control packets as explained above.

Circuit switched function interface 406 defines the commands to the circuit switching function 408 in order to synchronize this function with the medium configuration. For this purpose, circuit switch function 408 comprises two switching tables 409. These tables are updated by service manager 412 through interface 406 so as to correlate the complex frame slot number on the receive leg of an input link of the node to the complex frame slot number on the transmit leg of the output link which is used for routing the call packets. In the end nodes i.e. originator and destination nodes, the switching tables correlate the circuit user number with one link and incoming and outgoing slots on this link.

Packet switched function interface 410 defines the necessary commands and signals between the service manager 412 and the packet switched function 414 in order to manage the packet flow including the data and control packet flows.

Network service interface 416 defines the messages exchanged between the system manager 418 and the network service function which includes the configuration service, the directory service, the measurement service and the maintenance service.

There are two kinds of protocols, namely the medium access protocol MAP that describes the exchanges over the medium at medium complex frame level and which has been described in connection with FIGS. 6 and 7 and the service manager protocol SMP that describes the exchanges between two system managers.

The residual clear channel is configured inside the complex frames built as described above, to carry bit packets using the virtual circuit/logical channel number VC/LCN of the X25 protocol for example.

As already explained, the LCN=0 is reserved and the packet circulating on this LCN are routed to the system service manager 418, as a network service communication channel used in cooperation with the metwork configuration services. This channel is schematically shown as the configuration service channel CSC in FIG. 10.

Figure 11:
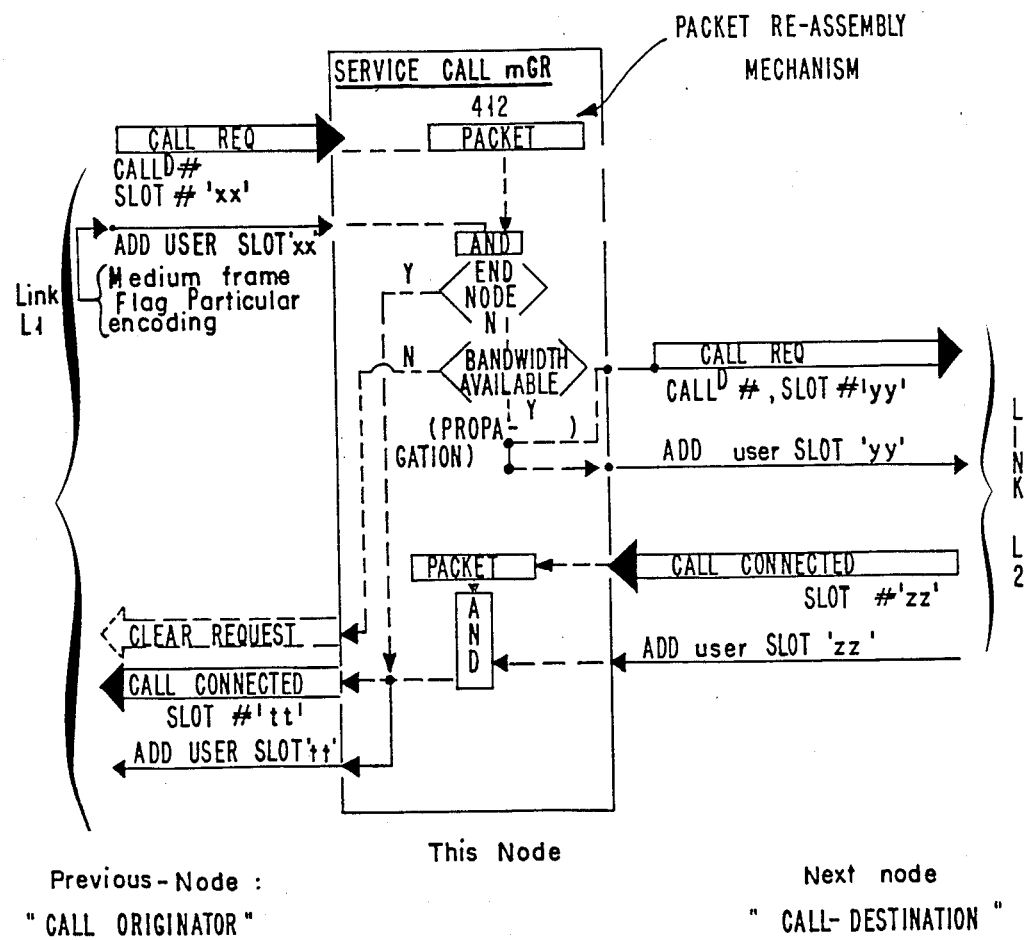
FIG. 11 shows the call set up flow which results in dynamically allocating a circuit slot in the complex frames.

FIG. 11 shows the call set up flow through a system node in a specific case. It is assumed that circuit user X connected to originator node A wants to establish a call with circuit user Z connected to destinator node C, through intermediate node B. Service manager 412 in node A causes the call initiation phase to be entered. During this phase using the asynchronous packet flow (LCN=0), a call request packet is sent by the originator node A to node B. This packet includes the called number and potentially the calling number, information indicating that a circuit switched call is to be established and the slot number assigned to user X on the incoming leg of link L1 connecting node A to node B. The opening flag of the subsequent complex frame generated by the transmitting means in node A is set to a value 0101"xx", indicating that a circuit user is to be added and that slot number "xx" is assigned to it. For example if the complex frames contained 2 circuit slots, slot 3 is assigned to user X in the subsequent transmitted complex frames. The slot table of the transmitting means in node A is updated. The decoding by node B of this new UCC flag indicates to node B, the complex frame from which the change is effective.

Node B service manager waits for the two correlated information: call request packet and UCC flag 0101"xx" to determine whether it is the destination node or whether the call request packet has to be propagated to another node found as usual in a network by consulting routing tables.

If node B is, as assumed, an intermediate node the service manager in node B checks whether a circuit user slot may still be allocated in the complex frame to be generated on the outgoing leg of the medium link L2 between node B and destination node C. If yes, the call packet is propagated to node C, said call packet including the called number, information indicating that a circuit switched call is to be established and the slot number "yy" assigned to user X in the complex frame generated from B toward C on link L2. The slot table in the transmitting means attached to the medium link L2 between B and C is updated and flag UCC in the subsequent frames transmitted on this link is set to 0101"yy", where "yy" indicates the slot number assigned to user X on this link.

Receiving means in node C attached to this link receives the so generated complex frames. The node C service manager determines that destination user Z is attached to this node and sent to node B a call connected packet indicating that slot "zz" is assigned in the complex frame to be generated from node C toward node B, to user Z. The UCC flag is set to 0101"zz".

Detection in node B of the call connected packet and correct correlation with the flag 0101"zz"" causes the call connected packet to be propagated to node A, the slot table in the node B receiving means controlling the medium link L2 between C and B is updated.

The call connected packet is propagated by node B to node A on the link L1. Service manager in node B assignes slot"tt" to user Z and the UCC flag in the subsequent frames generated by node B transmitting means controlling the link L1 between B and A is set to 0101"tt".

Detection in node A of the call connected packet and of flag 0101"tt" causes receiving slot table of the link L1 between node B and A to be updated and completes the call initiation and call completion phases.

The switching tables in each node are updated when the call control packets: call request packet and call connected packet are propagated through the node so as to contain the correlation between the slot number on the incoming link with the identification of the outgoing link and slot number on this link. For example in node B, the switching slot tables keep track of the correlation between xx on link L1 and yy on link L2 and of zz on link L2 and tt on line L1.

The call control packets may have to be propagated through several intermediate nodes depending upon the routing capabilities in the network. The sames operations as described above are performed in each node.

If it were found in one of the intermediate node that a circuit user slot may not be allocated, this occurs when there is no more bandwidth available for circuit users, a clear request packet is sent by this intermediate node to the originator node.

In case node B were not an intermediate node, but the destination node, the call connected packet or the clear packet as the case may be is directly sent by node B to node A with the flag 0101"tt" correlated to the call connected packet.

When the called initiation phase and the call completion phases as described above are completed, a new full duplex circuit referenced by the slot numbers exists between nodes A and C. The bandwith used to carry these slots has been removed from the asynchronous flow.

Consequently, the complex frames must at any time include some bits dedicated to the asynchronous flow. It is the responsability of the node service manager to determine the minimum bandwidth that must remain available for the asynchronous flow. In fact the call control packets are sent using these bits in as many complex frames as required to transmit them. Whenever this minimum number is reached, attempt to establish an additional circuit slot is rejected (clear phase)

The same mechanisms ars those described above in connection with the call initiation and call completion phases are used for the clear initiation and clear completion phases for deleting the circuit user slots, except that the C flag bit is set to 0 instead of being set to 1 and the call request packet is replaced by a clear request packet and the call connected packet is replaced by a clear confirmation packet. This causes the slots which were previously allocated during the call initiation and call completion phases to be deleted.

In the above description, it has been assumed that the call control packets were sent on the same links as the frames in which slots have to be added or deleted. However this is not a requirement. The call control packets may be sent on medium links through network nodes specifying on which links connected to the same nodes the circuit slots have to be added or deleted. The flag are changed in the frames sent on these links. The service manager in each node waits for the two information: slot and link number in the control packets and new UCC flag, as described in connection with FIG. 11.

The establishment of a circuit connection between two nodes may involved up to four different links in the most general case instead of the unique link L1 as shown in FIG. 11:

first incoming link transporting the call request packet, in this case the call control information comprises in addition to the slot number the called number, the calling number and the identification of a second incoming link on which the circuit slot is to be established, third outgoing link transporting the call connected packet in this case the call control information comprises in addition to the slot number, the called number, the calling number and the identification of a fourth outgoing link on which the circuit slot is to be established.

We claim:

1. A method for configuring a succession of complex bit frames for exchanging synchronous circuit switched bits such as digitized voice signals which have been sampled at a frequency fs and coded with m bits per sample and asynchronous packet switched bits, between nodes interconnected by transmission links working at a plurality of bit rates V said method comprising the steps of:

generating in sequence a plurality of complex frames each containing an integer number of bits Nc or Nc+1 each of which complex frame includes n subframes where n is an integer number equal to or greater than one, each of said complex frames being provided with a flag field f, the period of each said complex frame is made to equal a value n.T+e where T is equal to the reciprocal of the sampling frequency fs used for providing the circuit switched bits, e is less than the link bit period, Nc is the integer part of V.n.T and selected to be as close as possible to an integer number Na which is the number of bits in the time period T on the link having the maximum bit rate Vmax and n is the integer part of Na/Nts where Nts is the integer part of V.T;

calculate the remaining bits R in each complex frame where R=n[V.T−Nts], compare the calculated value of R to f if R is greater than f used the computed value of Nts in subsequent steps, if not decrement Nts by one and recalculate R until R is greater than f and use the decremented value of Nts in subsequent steps;

allocate an integer number of the Nts bits in each said subframe to an integer number of circuit switched bit slots and the remaining bits to asynchronous packet switched bits; and partition the R remaining bits between the flag field f and residual bits r where r=R−f, said r residual bits being used for asynchronous packet switched bits, whereby the complex frames may be retrieved and distributed at the receiving end of the transmission link by detecting the flag f and counting the bits in the complex frame.

2. A method according to claim 1 characterized in that all of the subframes contain an equal number of bits.

3. A method according to claim 1 characterized in that at least one of the subframes includes at least one additional bit of the r residual bits.

4. A method according to claim 1 characterized in that the f flag bits precede the subframes and the r residual bits follow the subframes.

5. A method according to any one of claims 1 to 4 characterized in that the flag f includes at least two bits which are set to different values.

6. A method according to claim 5 characterized in that the flag f includes more than two bits and that preselected bits in excess of two are coded in selected complex frames for identifying a change in the status of a bit slot.

* * * * *

UNITED STATES PATENT AND TRADEMARK OFFICE
CERTIFICATE OF CORRECTION

PATENT NO. : 4,761,781
DATED : Aug. 2, 1988
INVENTOR(S) : J. Calvignac et al

It is certified that error appears in the above-identified patent and that said Letters Patent is hereby corrected as shown below:

On the face of the patent, change the serial number from "893,075" to --893,073--.

Signed and Sealed this

Thirteenth Day of December, 1988

Attest:

DONALD J. QUIGG

Attesting Officer

Commissioner of Patents and Trademarks